United States Patent Office 2,824,842
Patented Feb. 25, 1958

2,824,842

URINE CALCIUM TEST

Hirsh Sulkowitch, Newton, Mass.

No Drawing. Application June 9, 1954
Serial No. 435,639

4 Claims. (Cl. 252—408)

This invention relates to the testing of body fluids, particularly urine, to determine the calcium content. Tests of this nature are used as an aid in the diagnosis of hypo- and hyper-parathyroidism, rickets, metabolic and other bone disease, and renal disease, and as a control in the administration of such medicinal preparations as dihydrotachysterol, vitamin D, and various hormone and other preparations.

A moderate amount of calcium in the urine, in certain conditions, indicates that the blood calcium is at a normal level. If the blood calcium is below normal, little or no calcium is found in the urine. In certain diseases, and in the course of treatment with certain of the above preparations, the amount of calcium appearing in the urine may become excessive. A test of this type here described is useful both for diagnostic purposes, and to maintain an accurate check on the calcium content of the urine during the course of treatment, with drugs, such as those mentioned, which may have dangerous or undesirable effects if used to excess, so that the administration of the drug may be promptly discontinued or reduced on the appearance of excess calcium.

In a calcium test hitherto commonly used, urine is mixed in equal parts with a liquid reagent consisting chiefly of oxalic acid, ammonium oxalate, and glacial acetic in distilled water. The oxyalic acid and ammonium oxalate react with the calcium in the urine to form calcium oxalate. In this test a moderate amount of urinary calcium will result in a fine white cloud. A milky precipitate indicates excessive calcium, and absence of precipitate indicates that the serum calcium is subnormal.

This method of test, although widely used, and one of the most satisfactory to date, is subject to certain disadvantages. The reagent solution is somewhat difficult to mix and, unless made properly, is likely to give inaccurate results. Age of the solution, and impurities in the glass container in which it is stored, also have an adverse effect. The accuracy of the test also depends to a certain extent on skill and experience, and errors occur because of failure to judge the relative quantities of urine and reagent accurately.

The chief source of error, however, arises from the fact that the pH of the reagent itself is low and there is no way of controlling the pH of the test mixture. In a mixture of pH below 4, calcium oxalate becomes soluble, and if the pH is below about 2.8, a fair amount of the calcium oxalate remains in solution, so that the results of the test are misleading. This occurs when the urine is very dilute, as in the case of certain renal diseases, or under temporary conditions. On the other hand, if the pH of the mixture is higher than 5, the magnesium and phosphates in the solution, which are soluble in the pH range between 4 and 5, become insoluble in the more alkaline solution and form precipitates which give a false positive test. Although a pH between 4 and 5 represents the ideal, it has been found that, for purposes of qualitative observation, a variation in pH of 2.8 to 5.5 can be tolerated, as only a small percentage of the calcium compound will dissolve at the lower limit of this range, and the amount of magnesium phosphate precipitate occurring at the upper limit is not sufficient to obscure the results of the test unduly.

One of the chief objects of this invention is to provide a reagent which tends to maintain the pH of the test mixture within the proper range to ensure precipitation of the calcium compounds alone, and which gives a positive indication when the proper pH range is exceeded, so that the user knows that the test is unreliable.

Other objects are to provide a dry reagent for the above purpose which can be stored indefinitely and conveniently transported, which gives reliable results, and is sufficiently simple and convenient to use so that a patient may be readily instructed to use it at home.

The reagent here described is prepared in tablet or capsule form and consists in general of a mixture of oxalic acid, ammonium oxalate, and a buffer salt, such as potassium acid phthalate, and potassium acid phosphate. It it important that the buffer be suitable for maintaining the pH value of the urine solution in the range between 2.8–5.5. An indicator, such as chlorphenol red or bromocresol purple is preferably included, to show that the pH value exceeds the upper limit, as may occur when the urine is originally very alkaline, or is not fresh. A high pH value causes the solution to turn red or purple, depending on the indicator used.

The preferred reagent is composed according to the following formula:

| | Grams |
|---|---|
| Oxalic acid | 40 |
| Ammonium oxalate | 25 |
| Potassium acid phthalate | 50 |
| Potassium acid phosphate | 35 |
| Chlorphenol red | 0.25 |
| Potassium acid carbonate | 24 |

The pH of this mixture is about 3.5. This mixture is divided into ½ gram batches and put up as tablets or capsules. For making a test, one tablet, or the contents of one capsule, are dropped in a test tube containing about 5 cc. of urine. The proportion of urine is not critical and may vary between 1 and 10 cc. As in the old solution test described above, a fine white precipitate indicates normal calcium content, no precipitate a deficiency of calcium, and a milky precipitate excessive calcium.

Sodium salt, such as sodium acid phosphate, sodium acid phthalate, and sodium bicarbonate, might be substituted for the potassium salts, but the potassium salts are preferable from the standpoint of solubility.

Other buffers of the following group may also be substituted in the above formula for the potassium acid phosphate:

Monosodium maleate
Monosodium malonate
Monosodium succinate

Buffer salts of the following group may likewise be substituted for the potassium acid phthalate:

Monosodium glutarate
Monosodium itaconate
Monosodium malate
Monosodium pimelate
Monosodium pyrotartrate The above formula may be varied by omitting the potassium acid phosphate entirely, or by reducing the potassium acid phthalate to about 25 grams, although either of these variations results in a somewhat higher pH. The amount of oxalic acid may also be varied down to about 25 grams.

The main functions of the potassium acid carbonate are to produce effervescence due to the release of carbon dioxide gas when the tablet is dropped in the urine, thus causing the tablet to mix rapidly, and also to make the mixture a more soluble one. Sodium bicarbonate may also be used for these purposes. Either substance also performs an additional function in approximating the desired pH in the solution.

The results of a test using the type of dry reagent here described are always reliable, as the buffer salts prevent the test solution from becoming sufficiently acid to dissolve a substantial amount of the calcium oxalate. If the pH goes over about 5, the indicator imparts a characteristic red or purple color to the solution, thus warning the user that the test is inaccurate. As excessive alkalinity frequently results from letting the urine stand too long before testing, a new test performed with fresh urine will usually produce satisfactory results.

What is claimed is:

1. A reagent in dry solid form for semiquantitatively estimating the calcium content of body fluids comprising oxalic acid and ammonium oxalate in the proportion of about 25–40 parts by weight of oxalic acid to 25 parts ammonium oxalate, a buffer adapted to maintain a pH in the range between 2.8 and 5.5 when the reagent is added to the fluid to be tested, said buffer being the combination of: (A), a monoalkali metal salt of an acid selected from the group consisting of phosphoric acid, maleic acid, malonic acid and succinic acid; and (B), a monoalkali metal salt of an acid selected from the group consisting of phthalic acid, glutaric acid, itaconic acid, malic acid, pimelic acid and pyrotartaric acid, and a pH indicator adapted to produce a predetermined color when the pH of the fluid to be tested, after addition of reagent, exceeds pH 5.5.

2. A reagent in dry solid form for semiquantitatively estimating the calcium content of body fluids comprising: oxalic acid and ammonium oxalate in the proportion of about 25–40 parts by weight of oxalic acid to 25 parts by weight of ammonium oxalate; a buffer adapted to maintain a pH in the range between 4.0 and 5.5 when the reagent is added to the fluid to be tested, said buffer being the combination of (A), a monoalkali metal salt of an acid selected from the group consisting of phosphoric acid, maleic acid, malonic acid and succinic acid; and (B), a monoalkali metal salt of an acid selected from the group consisting of phthalic acid, glutaric acid, itaconic acid, malic acid, pimelic acid and pyrotartaric acid; an alkali carbonate in amount sufficient to produce effervescence when the reagent is contacted with the fluid to be tested; and a pH indicator adapted to produce a predetermined color when the pH of the fluid to be tested, after addition of reagent, exceeds pH 5.5.

3. A reagent in dry solid form comprising by weight of

| | Parts |
|---|---|
| Oxalic acid | 40 |
| Ammonium oxalate | 25 |
| Potassium acid phthalate | 50 |
| Potassium acid phosphate | 35 |
| Potassium acid carbonate | 24 |
| pH indicator responsive to pH exceeding 5.5 (selected from the group consisting of chlorophenol red and bromocresol purple) | 0.25 |

4. A reagent for detecting calcium in body fluids comprising: oxalic acid and ammonium oxalate in the proportion of about 25–40 parts by weight of oxalic acid to 25 parts by weight of ammonium oxalate; a potassium acid phthalate-potassium acid phosphate buffer adapted to produce a pH value in the range between 2.8 and 5.5 when the reagent is added to the fluid to be tested, an alkali carbonate in amount sufficient to produce effervescence when the reagent is contacted with the fluid to be tested; and a pH indicator adapted to produce a predetermined color when the fluid to be tested, after addition of reagent, exceeds pH 5.5.

References Cited in the file of this patent

UNITED STATES PATENTS

| 1,868,364 | Parker | July 19, 1932 |
| 2,387,244 | Compton et al. | Oct. 23, 1945 |
| 2,577,978 | Nicholls et al. | Dec. 11, 1951 |
| 2,787,597 | Shinohara | Apr. 2, 1957 |

FOREIGN PATENTS

| 360,402 | Great Britain | Oct. 26, 1931 |

OTHER REFERENCES

"Official and Tentative Methods of Analysis of the Association of Official Agricultural Chemists," 6th ed., 1945, published by the Association of Official Agricultural Chemists, P. O. Box 540, Benjamin Franklin Station, Washington 4, D. C., page 640.

Textbook of Quantitative Inorganic Analysis, Kolthoff and Sandell, New York, 1947, pages 348, 355, 356, The Macmillan Co.

"Practical Physiological Chemistry," Hawk Oser and Summerson, 1947, P. Blakiston's Son and Co. Inc., Philadelphia, pp. 896 and 897.